3,082,269
POLYMERIZATION PROCESS

John Brian Armitage, Wilmington, Del., assignor to E. I. du Pont de Nemours and Company, Wilmington, Del., a corporation of Delaware
No Drawing. Filed July 2, 1958, Ser. No. 746,068
1 Claim. (Cl. 260—673)

The present invention relates to a process for preparing substituted benzenes, and more particularly to the preparation of hexa-substituted benzenes from di-substituted acetylenes.

It is the object of the present invention to provide a process for the economical preparation of hexa-substituted benzenes which heretofore could only be prepared with difficulty and at high cost.

In accordance with the present invention, hexa-substituted benzenes are prepared by the process which comprises contacting acetylene having the formula R—C≡C—R' wherein R and R' are hydrocarbon radicals, in the presence of an inert hydrocarbon solvent with a catalyst obtained by the reaction of a transition metal halide with an organometallic compound.

Although it has been known heretofore that acetylene would polymerize employing a catalyst formed by the reaction of a transition metal halide with an organometallic compound, the products stated to be obtained by such a polymerization have been identified as linear polymers. The polymerizations known heretofore have furthermore been limited to acetylene and acetylenes which contain only one substituent. It was therefore surprising to find that di-substituted acetylenes would polymerize with the described catalyst system and furthermore would form benzene structures.

The acetylenes suitable in the present invention are, as stated hereinabove, di-substituted acetylenes. It was found that the benzene formation is limited to di-substituted acetylenes in which the acetylene substituents are hydrocarbon radicals. Representative examples of the acetylenes useful in the formation of the benzene compounds are such acetylenes as dimethyl acetylene, diethyl acetylene, dipropyl acetylene, dibutyl acetylene, methylethyl acetylene, methylpropyl acetylene, ethylbutyl acetylene, diphenyl acetylene, phenylmethyl acetylene, phenylethyl acetylene, and similar acetylenes.

The catalyst employed in the process of the present invention is the reaction product obtained by reacting a transition metal halide with an organometallic compound. The transition metals, the halides of which are suitable in the formation of the catalyst employed in the present invention, are found principally in Group IV, Group V, and Group VI of the periodic table of elements. The transition metals have been designated as Group IV–B, V–B, and VI–B of the periodic table in the "Handbook of Chemistry and Physics," Chemical Rubber Publishing Co., 37th Edition, page 392, and contain as such titanium, zirconium, hafnium, thorium, vanadium, columbium, tantalum, palladium, chromium, molybdenum, tungsten and uranium. The preferred transition metal halides are those of vanadium and titanium. The halide radical may be fluorine, iodine, bromine or chlorine, although the chlorides and bromides are preferred. The halides suitable in the formation of the catalyst include mixed halides and oxyhalides.

The second component employed to form the catalyst in the process of the present invention is an organometallic compound which contains the bond M—R, where M is a metal and R is a hydrocarbon radical. The metal in the organometallic compound employed as a catalyst component is generally a metal selected from Group I–A, I–B, II–A, II–B, III–A and IV–A of the periodic table of elements. Examples of the metals employed are the alkali metals, the alkaline earth metals, zinc, cadmium, mercury, aluminum, boron, lead and tin. The hydrocarbon radical to which this metal is attached may be either an alkyl, an alkenyl, or an aromatic hydrocarbon radical. Specific illustrations of the organometallic compounds employed as catalyst components in the present invention are lithium phenyl, sodium ethyl, potassium toluyl, magnesium dimethyl, magnesium diphenyl, calcium tripropyl, aluminum triethyl, aluminum triisobutyl, aluminum trioctyl, aluminum tridodecyl, tin tetrabutyl, tin tetraethyl, tin tetraphenyl, lead tetramethyl, lead tetrabutyl, zinc diphenyl, zinc dipropyl, zinc dibutyl, zinc dipentyl, cadmium diethyl, cadmium diphenyl, cadmium dihexyl, mercury dimethyl, mercury diethyl, mercury dipropyl, mercury diphenyl, etc. The term "organometallic" compound also includes such compounds as contain more than one specific metal in the molecule, such as potassium aluminum alkyls, lithium aluminum alkyls, lithium aluminum aryls, sodium aluminum alkyls, sodium boron alkyls, sodium mercury alkyls, potassium boron alkyls, magnesium aluminum alkyls, etc. The organometallic compounds employed in the formation of the catalyst are not necessarily limited to organometallic compounds containing metal to hydrocarbon bonds exclusively. There are thus included as useful organometallic components Grignard reagents, alkyl metal hydrides, alkyl metal halides, aryl metal halides, aryl metal hydrides, and similar compounds containing a metal-to-hydrocarbon bond.

The ratio in which these catalyst components are employed to form the catalyst is not critical. Thus minute quantities of either of the transition metal halide of the organometallic compound may be combined with larger quantities of the other component and will result in catalysts having activity in the process of the present invention. However, optimum activity of the catalyst is obtained when the molar ratio of the organometallic component to the transition metal halide is maintained in a range of from 0.5 to 10. The quantity of the catalyst employed is equally not critical. A large excess of the catalyst will result in the formation of the products of the present invention. Preferred catalyst concentrations are in the range of 0.001 to 10% of the monomer as determined on a weight basis.

The catalyst is generally formed in the solvents in which the benzene formation is to be carried out. The catalyst may be formed prior to the polymerization and stored, or may be formed at the site and time of polymerization. The catalyst formation is almost instantaneous and occurs over a wide range of temperatures including such temperatures as are employed for the polymerization of the present invention.

The process of the benzene formation of the present invention is carried out over a wide range of temperatures. Thus temperatures from below 0 to about 270° C. may be employed. Since the reaction is slightly exothermic, it is in general preferred to employ temperatures in the range of 1 to 100° C. Room temperature is particularly preferred because it requires neither heating nor cooling of the reaction mixture. As stated hereinabove, the process is carried out in the presence of an inert organic solvent. Such solvents are preferably hydrocarbon solvents liquid at the polymerization conditions. Hydrocarbon solvents which are suitable as reaction media include such hydrocarbons as hexane, heptane, nonane, cyclohexane, toluene, xylene and similar inert hydrocarbon solvents. The polymerization pressure is not critical to the benzene formation of the present invention. Thus atmospheric pressure or autogenous pressure is generally employed although higher or lower pressures are equally suitable if desired. The reaction is carried out in any suitable reaction vessel in an inert atmosphere. Since oxygen and compounds containing hydroxyl groups react with the catalyst destroying its catalytic activity, their presence is as far as possible avoided. Nitrogen provides a highly suitable inert atmosphere.

The invention is further illustrated by the following examples.

*Example I*

Into a 250 ml. round-bottom-flask equipped with reflux condenser, stirrer, dropping funnel, thermometer, gas inlet and outlet means was charged under an atmosphere of nitrogen, 8.9 g. of diphenyl acetylene dissolved in 50 ml. of cyclohexane. To this was added a catalyst mixture consisting of 50 ml. cyclohexane, 5 millimoles titanium tetrachloride, and 10 millimoles of lithium aluminum tetraheptyl. Reaction commenced immediately with evolution of heat, and after 24 hours the resultant slurry was blended with methanol and a white solid separated. After filtration, washing with methanol and drying, there was obtained 7.5 g. of hexaphenylbenzene having a melting point at 422° C. The melt was stable in air up to 500° C. The hexaphenylbenzene was further identified by its infrared spectrum.

*Example II*

Employing the procedure of Example I, 10.8 g. of dimethylacetylene was reacted with the catalyst system described. On work-up, there was obtained 7 g. of hexamethylbenzene having a melting point at 162° C. The structure of this compound was confirmed by infrared analysis.

*Example III*

Into a 250 ml. round-bottom-flask equipped with stirrer, reflux condenser, thermometer, dropping funnel and gas inlet and outlet means, there was charged under nitrogen 50 ml. of cyclohexane, 0.002 of vanadyl trichloride and 0.004 moles of aluminum triisobutyl. To the reaction mixture was then charged 10.8 g. of dimethyl acetylene in 50 ml. of cyclohexane. The reaction mixture was agitated for 2 days at 25° C. The resulting reaction mixture was worked up in accordance with the procedure described in Example I. There was obtained 0.4 g. of hexamethylbenzene.

It is to be understood that the examples hereinabove illustrated merely represent specific embodiments of the process of the present invention. Similar results are obtained with catalysts formed from other transition metal components and organometallic compound components described hereinabove. The invention is therefore not to be construed as being limited to the examples shown. The compounds prepared by the process of the present invention are highly useful chemical intermediates which on halogenation give rise to valuable insecticides. The compounds may further be employed as heat transfer media, since they are characterized by outstanding high temperature stability in air. Thus, as shown by the examples, hexaphenylbenzene can be exposed to air at temperatures as high as 500° C. without decomposition. The process of the present invention therefore provides an economical and simple process for the preparation of hexa-substituted benzenes.

I claim:

Process for the preparation of hexamethylbenzene which comprises contacting dimethyl acetylene in the presence of an inert liquid hydrocarbon medium with a catalyst obtained by the reaction of vanadyl chloride with aluminum triisobutyl.

References Cited in the file of this patent

UNITED STATES PATENTS 2,723,299    Tanaka et al. _____ Nov. 8, 1955
2,990,434    Smith _____ June 27, 1961

FOREIGN PATENTS 538,782    Belgium _____ Dec. 6, 1955

OTHER REFERENCES

Raphael: "Acetylenic Compounds in Organic Synthesis," Academic Press Inc., New York, 1955, pp. 159 and 160 only relied on.